(12) United States Patent
Baum (10) Patent No.: US 7,899,437 B2
(45) Date of Patent: Mar. 1, 2011

(54) SPEAKERPHONE CONTROL TECHNIQUES AND EMERGENCY CALL SYSTEMS

(75) Inventor: Elliot Baum, Dix Hills, NY (US)

(73) Assignee: Telemergency Systems LLC, Ronkonkoma, NY (US)

( * ) Notice: Subject to any disclaimer, the term of this patent is extended or adjusted under 35 U.S.C. 154(b) by 1269 days.

(21) Appl. No.: 11/423,872

(22) Filed: Jun. 13, 2006

(65) Prior Publication Data

US 2007/0286375 A1 Dec. 13, 2007

(51) Int. Cl.
*H04M 11/04* (2006.01)

(52) U.S. Cl. ...................... 455/404.1; 379/45

(58) Field of Classification Search .............. 455/404.1; 379/37–52, 388.02, 420.01, 388.07
See application file for complete search history.

(56) References Cited

U.S. PATENT DOCUMENTS

| | | | |
|---|---|---|---|
| 4,371,751 | A | 2/1983 | Hilligoss, Jr. et al. |
| 4,492,820 | A | 1/1985 | Kennard et al. |
| 5,333,172 | A | 7/1994 | Stevens |
| 5,673,304 | A | 9/1997 | Connor et al. |
| 5,742,666 | A | 4/1998 | Alpert |
| 6,060,979 | A | 5/2000 | Eichsteadt |
| 6,212,260 | B1 | 4/2001 | Baum et al. |
| 6,574,484 | B1 | 6/2003 | Carley |
| 6,614,883 | B2 | 9/2003 | Baum et al. |
| 7,046,985 | B2 * | 5/2006 | Seales et al. ............. 455/404.1 |
| 7,092,695 | B1 * | 8/2006 | Boling et al. ............ 455/404.1 |
| 7,333,798 | B2 * | 2/2008 | Hodge ........................ 455/411 |
| 2005/0048945 | A1 | 3/2005 | Porter |
| 2005/0282518 | A1 * | 12/2005 | D'Evelyn et al. ........ 455/404.1 |
| 2007/0082651 | A1 * | 4/2007 | Loizeaux ................. 455/404.1 |

FOREIGN PATENT DOCUMENTS

| | | |
|---|---|---|
| JP | 08-130589 A | 5/1996 |
| WO | WO 92/14333 A1 | 8/1992 |
| WO | WO 98/53624 A1 | 11/1998 |

OTHER PUBLICATIONS

U.S. Appl. No. 11/356,519, filed Feb. 17, 2006, Inventors: E. Baum et al, Title of Invention: Telephone Line Dialer and Emergency Call System.

* cited by examiner

*Primary Examiner*—Curtis Kuntz
*Assistant Examiner*—Maria El-Zoobi
(74) *Attorney, Agent, or Firm*—Holtz, Holtz, Goodman & Chick, PC (57) ABSTRACT

Emergency call system which enables an individual to summon assistance includes an emergency call unit connectable to a telephone line, at least one remote speakerphone unit having a speakerphone and connectable to the same telephone line as the emergency call unit, and at least one pendant adapted to be worn by the individual and including a button. The emergency call unit is arranged to determine whether any remote speakerphone units are off-hook when the button on the pendant is actuated and if so, send a signal to each remote speakerphone unit to disconnect from the telephone line. If one of the remote speakerphone units is off-hook, it will not interfere with the functioning of the emergency call unit. The emergency call unit is also arranged to dial a predetermined emergency telephone number when the button on the pendant is actuated and the telephone line is available for an outbound call.

24 Claims, 4 Drawing Sheets

SPEAKERPHONE CONTROL TECHNIQUES AND EMERGENCY CALL SYSTEMS

FIELD OF THE INVENTION

The present invention relates generally to arrangements and methods for controlling and using speakerphones associated with telephones.

The present invention also relates generally to emergency call systems, and in particular, to emergency call systems for aiding persons in distress, for example, due to medical, fire, burglary or other emergencies.

BACKGROUND OF THE INVENTION

Nowadays, a vast majority of telephones include a speakerphone which allows for hands-free use of the telephone. When the speakerphone is activated, e.g., by pressing a button on the telephone, a user can talk and listen over the telephone line so long as the user remains within the reception or talking range of a microphone associated with the telephone and within the listening range of the speakerphone. If the user moves out of the reception range, although they can speak, the other party to the call will not be able to hear the user. Similarly, if the user moves out of the listening range, the user will not be able to hear the other party to the call.

If the user then walks into a room with a similar telephone equipped with a speakerphone and microphone, the user will have to press a button on this telephone in order to join the call. Thus, as the user walks around a home or office having multiple telephones, the user will have to individually activate each speakerphone in order to enable its use.

It would therefore be desirable to provide a speakerphone control technique for use with multiple telephones having speakerphones which allows a user to walk through a home or office while conducting a telephonic conversation with another party without having to individually activate each and every speakerphone in the home or office.

Emergency call systems are known in which a person in distress can get immediate help. Specifically, in such systems, the person presses a button on a remote emergency pendant which transmits a signal to an alarm in the person's house. The alarm then sends a signal to a central station, and a person at the central station must then dial the telephone numbers from a prescribed list in order to obtain aid for the distressed person.

However, such an arrangement is relatively complicated and costly. Specifically, such an arrangement operates in a similar manner to a central burglar or fire alarm in a house, and requires a separate, complicated wiring assembly for the house, at a considerable cost. Also, such a system requires that a central station be provided, and therefore, the subscriber to such a system must pay a monthly fee for such service, adding further to the cost of the system.

Also, a problem with known systems is that if a central station, upon calling a telephone number for aid, continuously receives a busy signal, the central station may stop calling after a number of attempts, so that the person in distress does not receive aid.

Emergency call systems have therefore been invented which are connected to the telephone line and enable a caller to automatically call a plurality of other parties to leave an emergency message, sometimes, simply by pressing a button.

Examples of such emergency call systems are disclosed in U.S. Pat. Nos. 6,212,260 and 6,614,883, incorporated by reference herein, wherein the emergency call systems include an emergency call unit having a memory for storing telephone numbers to be called and an emergency message, an emergency key, and a microprocessor for controlling, among other things, storage of the telephone numbers and emergency message in the memory, dialing of the telephone numbers in sequence upon activation of the emergency key, and transmission of the emergency message to the dialed telephone number to automatically advise of an emergency.

Such emergency call systems can also be equipped to enable the user in need of assistance to talk to the called party via a speakerphone on the emergency call unit.

If an emergency call system includes both a remote emergency pendant and an emergency call unit, when faced with an emergency situation, the user can depress a button on the emergency call unit or a button on the pendant to summon help so that the emergency call unit will automatically connect to the telephone line and dial a predetermined set of telephone numbers. There are thus two different ways to summon assistance, depending on the user's proximity to the emergency call unit, i.e., if the user is far from the emergency call unit, they can press the button on the pendant while if they are close, they can press the button on the emergency call unit. In at least the latter case, the speakerphone will automatically be activated to allow the user in the emergency situation to converse, if possible, with a called party via the speakerphone. However, note that use of the speakerphone is only possible when the person in the emergency situation is in the same room or in the general vicinity of the emergency dialer.

By contrast, the emergency pendant can transmit an emergency request from distances of over 100 feet. So while aid can be summoned from a greater distance using the remote emergency pendant, the person summoning help will not be able to converse with a called party from such a distance. Further if an extension telephone is off-hook, the emergency call unit will not be able to place any emergency calls since it cannot gain control of the telephone line.

It would therefore be desirable to provide an emergency call unit which overcomes the deficiencies described above in that it allows an emergency speakerphone dialer system to be configured to permit communication between the called party and the person placing the emergency call, and allow emergency calls to be placed even when an extension telephone is off-hook.

OBJECTS AND SUMMARY OF THE INVENTION

Accordingly, it is an object of the present invention to provide emergency call systems that eliminate deficiencies of prior art emergency call systems described above.

It is another object of the present invention to provide new and improved emergency call units which permit communication between the called party and the person placing the emergency call.

It is still another object of the present invention is to provide new and improved emergency call units which allow emergency calls to be placed even when an extension telephone is off-hook.

It is yet another object of the present invention to provide new and improved techniques to control speakerphones associated with telephones. One such technique allows simultaneous activation of the speakerphone of multiple telephones situated throughout a home or office so that a user can walk throughout the home or office and use the closest speakerphone to participate in the telephonic conversation.

In accordance with one aspect of the present invention, a speakerphone control system includes a pendant adapted to be worn by the individual and including one or more response mechanisms for responding to a user's action and a plurality of speakerphone units coupled to a common telephone line and adapted to be arranged throughout a structure with partially overlapping or non-overlapping listening and talking ranges. Each response mechanism is arranged to convert the user's action into signals receivable by the speakerphone units to cause selected ones of the speakerphone units to activate their speakerphones such that when the speakerphone units are activated and a call is in progress on the telephone line, the user can interact with different speakerphone units.

The response mechanism may be one or more depressible buttons, a microphone and a voice-recognition circuit coupled thereto and combinations of the same. The response mechanism can be arranged to answer an incoming call or initiate an outgoing call based on the user's action.

An emergency call system in accordance with the invention which enables an individual to call for or summon assistance when desired includes an emergency call unit adapted to be connected to a telephone line, at least one remote speakerphone unit having a speakerphone and adapted to be connected to the same telephone line as the emergency call unit, and at least one pendant adapted to be worn by the individual and including at least one button. The emergency call unit is arranged to determine whether any of the remote speakerphone units are off-hook when a button on the pendant is actuated and if so, send a signal to each remote speakerphone unit to disconnect from the telephone line. In this case, if one of the remote speakerphone units is off-hook, it will not interfere with the functioning of the emergency call unit. The emergency call unit is also arranged to dial a predetermined emergency telephone number when the button on the pendant is actuated and the telephone line is available for an outbound call.

The emergency call unit may be arranged to send a signal to each remote speakerphone unit to activate its speakerphone while or after it dials the predetermined emergency telephone number. This allows the individual to hear the outbound dialing and communicate with the called party once the call is answered from any of the remote speakerphone units.

The emergency call unit may also be arranged to send a signal to each remote speakerphone unit to disable a keypad thereon at least while the emergency call unit dials the predetermined emergency telephone number.

The emergency call unit may also be arranged to send a signal to each remote speakerphone unit to deactivate its speakerphone after the emergency call unit completes a call to the predetermined emergency telephone number.

In one configuration, each remote speakerphone unit is associated with a respective pendant. In another configuration, only one pendant is provided and communicates only with the emergency call unit.

Another embodiment of an emergency call system for enabling an individual to call for assistance which may be incorporated into the emergency call system described above or used independent therefrom includes a pendant adapted to be worn by the individual and including at least one button and a communications unit having a speakerphone and being arranged to enable communications. The communications unit is arranged to activate and deactivate the speakerphone upon actuation of a button on the pendant. The communications unit may also be arranged to activate the speakerphone upon one depression of the first button and deactivate the speakerphone upon a subsequent depression of that button. In this case, the communications unit may also be arranged such that upon the subsequent depression of the first button, it deactivates the speakerphone even when the associated handset is removed from engagement with the communications unit.

This embodiment is particularly useful in a situation where another telephone unit is connected to same telephone line as the communications unit whereby the communications unit is arranged such that actuation of the button connects the speakerphone to the telephone line when the telephone unit is in use.

Another embodiment of an emergency call system in accordance with the invention which may be incorporated into the emergency call systems described above or used independent therefrom includes an emergency call unit adapted to be connected to a telephone line, an extension telephone, and an over-ride accessory for connecting the extension telephone to the same telephone line as the emergency call unit. The over-ride accessory communicate with the emergency call unit, e.g., via an RF transmission arrangement, and connects or disconnects the extension telephone from the telephone line based on signals from the emergency call unit. Thus, the emergency call unit includes a transmission portion or component for transmitting a command signal indicative of whether the over-ride accessory should connect or disconnect the extension telephone from the telephone line and the over-ride accessory including a receiving portion or component for receiving the command signal from the transmission portion or component. The emergency call unit may be arranged to transmit the command signal upon a determination that an outbound call cannot be made on the telephone line.

The above and other objects, features and advantages of the present invention will become readily apparent from the following detailed description thereof which is to be read in connection with the accompanying drawings.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
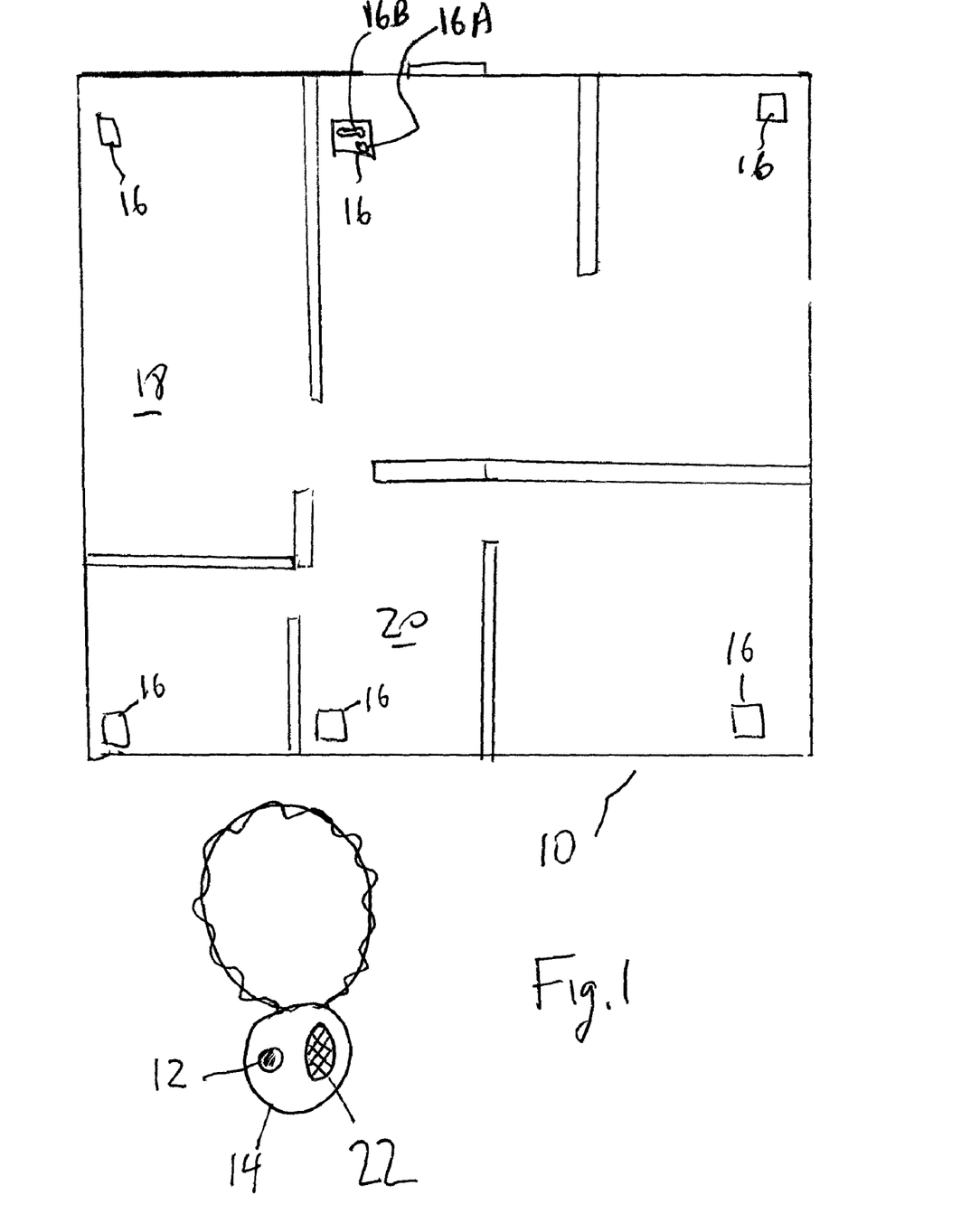
FIG. 1 is an illustration of a building showing the manner in which a speakerphone control technique is used in accordance with the invention.

Referring first to FIG. 1, a speakerphone technique in accordance with the invention allows a user in a home or office 10 to receive an incoming call and/or place a call with only a single depression of a button 12 on for example, a pendant 14, while providing use of multiple speakerphone units 16. That, by pressing button 12, the user can activate a plurality of speakerphone units 16 distributed through the home or office 10, for example, one in each room, and participate in a telephonic conversation using the speakerphone units 16 while the user is walking throughout the home or office 10. Although in this embodiment and other embodiments described below mention that one or more buttons are situated on a pendant, it is envisioned that in addition to or as an alternative to one or more buttons on a pendant, one or more buttons can be arranged on the speakerphone units 16, for example, either on the base or handset thereof. Such buttons would perform the same functions as the button(s) on the pendant, described more fully below.

Housed in pendant 14 is an electronic mechanism which converts the pressing of the button 12 into an electronic signal designed to activate one or more of the speakerphone units 16. The design and construction of this electronic mechanism, as well as an electronic mechanism in each speakerphone unit 16 to receive the signal from the pendant's electronic mechanism, would be readily ascertainable by one skilled in the art.

As used in the description of FIG. 1, a speakerphone unit 16 is a telephone which has a speakerphone feature and also includes a microphone to thereby enable the user to participate in the conversation, listening and talking, without having to handle the telephone or a handset thereof.

This is possible provided the user is always within range of one of the speakerphone units 16 while they walk around the home or office 10. When the speakerphone units 16 are those having sensitive speakerphones, such as a ClearVoice model sold by Telemergency, Ltd., then the user can be 20 feet or more away from the speakerphone unit 16 and still the speakerphone unit 16 will pick up the user's speech. For the user to hear the voice of the other party through the speakerphone, the volume setting of the speakerphone units 16 can be adjusted as necessary to ensure the user can hear, not only the other party but also preferably an incoming ring, at any location throughout the home or office 10. The number of speakerphone units 16 needed to ensure complete coverage through the home or office 10 depends, for example, on the model of speakerphone unit 16 used and the configuration and size of the home or office 10.

In use, a user would press button 12 when he or she hears an incoming ring tone. In one user-settable implementation, the incoming ring tone is activated on each speakerphone unit 16 while another setting would allow for generation of the incoming ring tone on only selected ones of the speakerphone units 16, on only a single speakerphone unit 16, or on only the speakerphone unit 16 closest to the user's current location. The user can activate this selectivity feature to limit the areas of the home or office 10 in which this technique can be applied.

Once button 12 is pressed, the selected speakerphone unit (s) 16 would be activated simultaneously (i.e., when each receives the electronic signal generated upon depressing button 12 on pendant 14) and connected to the telephone line to allow the user to talk in the vicinity of any selected speakerphone unit 16 and have their voice be received by that speakerphone unit 16. They would also hear the calling party's voice which would be generated at the selected speakerphone unit(s) 16.

Thus, an incoming call can be picked up on a single speakerphone unit 16 and the other speakerphone units 16 connected to the same telephone line can be joined into the call. The same ability to enable multiple parties to participate in a conversation on a single telephone line using multiple speakerphone units 16 or the handsets 16B thereof can be applied to an outgoing call made from one of the speakerphone units 16. Both techniques can be achieved once a phone call is in progress using one of the speakerphone units 16 or a handset thereof by pressing a button 16A on the speakerphone unit 16, or a button on the handset of the speakerphone unit 16 or a button on a pendant.

A result of the use of the speakerphone technique described above, in which selected ones or all of the speakerphone units 16 in a home or office 10 are simultaneously activated, is that multiple users can participate in the same telephone call even when situated in different parts of the home or office 10 and using different speakerphone units 16. Thus, one person in room 18 and another person in room 20 in home or office 10 can all participate in a conversation, i.e., a conference call. This can all be done simply by pressing button 12 on pendant 14.

To make an outgoing call, the user would dial the number at one of the speakerphone units 16 and then depress button 12. Thus would join all speakerphone units 16 to the outgoing call. When the called party answers, the user can then freely walk around the home or office and converse with the called party.

An additional design of the speakerphone units 16 described above allows for use of the speakerphone units 16 as an intercom system. Since the speakerphone units 16 would typically be placed throughout a home or office, it would be highly conducive for use as an intercom system. In such a system, a user would press button 12 when he or she hears wants to activate the intercom and communicate with someone else in the home or office, who might be situated at a distance from the user. In one scenario, button 12 activates all of the speakerphone units 16 whereas in other implementations, multiple buttons can be provided on pendant 14 and each activates a different group or overlapping group of speakerphone units 16 (described more fully below). Once button 12 is pressed, the selected speakerphone unit(s) 16 would be activated simultaneously (i.e., when each receives the electronic signal generated upon depressing button 12 on pendant 14) and allow the user to talk in the vicinity of any selected speakerphone unit 16 and have their voice be received by any other activated speakerphone unit 16 (as an intercom system). They in turn would hear the voice of other users talking into other speakerphone units 16.

The outgoing telephone line is bypassed during intercom use, and the telephone handsets may even be off-hook without interfering with the intercom system. However, the internal wiring of the speakerphone units 16 in the home or office is used for the intercom. As a result, any incoming sounds, such as a busy signal, must be filtered out so that they do not interfere with the conversations. To this end, a filter can be incorporated into the speakerphone units 16 to filter such noise, e.g., noise indicative of an inactive telephone sent by the telephone company. Alternatively, and for those situations when the telephone company sends a voice message about an inactive telephone, a designated button can be provided on the speakerphone units 16 which can be pressed to activate the intercom mode and cause a signal to be transmitted over the telephone line, e.g., every 5-15 seconds, to delay reception of a signal from the telephone company indicative of an inactive telephone. Such a signal can be the same as the signal generated when one of the telephone buttons is pressed since this will delay the generation of an inactive telephone signal as the telephone company is thereby caused to think an outgoing call is in progress. The user can also press one of the buttons every 5-15 seconds for the same effect.

A result of the use of the speakerphone technique described immediately above, in which selected ones or all of the speakerphone units 16 in a home or office 10 are simultaneously activated, is that multiple users can participate in the same conversation even when situated in different parts of the home or office 10 and using different speakerphone units 16. Thus, one person in room 18 and another person in room 20 in home or office 10 can all participate in a conversation by implementing the intercom system option. This can all be done simply by pressing button 12 on pendant 14.

A variation on the intercom system allows a person to use the handset 16B of a speakerphone unit 16, i.e., they would not have to use the speakerphone and microphone capabilities of the speakerphone unit 16. Rather, the person picks up the handset 16B and presses a button 16A on the speakerphone unit 16 (which could also be arranged on the handset 16B itself) and the speakerphone unit 16 bypasses the telephone line and activates the other speakerphone units 16 to provide for intercom use via the handset 16b and the speakerphone units 16. Note that if the handset is cordless, then both the handset of the speakerphone unit 16 and the base of the speakerphone unit may be part of the intercom network.

In the embodiment described above, pendant 14 includes a button 12 to activate the selected speakerphone unit(s) 16. Alternatively, pendant 12 can include multiple buttons with each being designated to activate one or more of the speakerphone units 16. When multiple buttons are provided, different combinations of buttons can activate different sets of speakerphone units 16. Markings as to which buttons or combination of buttons activate which speakerphone unit or units can be provided on the pendant. Moreover, one or more buttons may be designated to call a respective predetermined telephone number so that by simply pressing a button having a desired designation, a command is sent to a speakerphone unit 16 to initiate a call to the predetermined telephone number and some or all of the speakerphone units 16 are activated.

When a single button 12 is provided on a pendant 14, pendant 14 can be designed with appropriate electronics to cause one depression of button 12 to activate the selected speakerphone unit(s) and a subsequent depression of the button 2 to deactivate the speakerphone unit(s) 16. Alternatively, a second button can be provided in which case, one button is designated for activating the selected speakerphone unit(s) 16 and the other button is designated for deactivating the selected speakerphone unit(s) 16.

Instead of one or more buttons, pendant 14 may include a microphone 22 which allows for voice-recognition in order to generate the electronic signal to be sent to the speakerphone unit(s) 16 to cause their remote activation. When the user speaks a word, a voice-recognition circuit in the pendant 14 would recognize it and then causes activation of the selected speakerphone unit(s) 16. Different voice commands can be designated by the user, e.g., via programming of the voice recognition circuit, to activate one or more of the speakerphone units 16 or different sets of speakerphone units 16.

Instead of one or more buttons or a voice-recognition circuit, any other type of user response mechanism which is designed or programmed to respond to an action by the user may be used in accordance with the invention.

Any of the speakerphone control techniques described above can also be implemented in combination with an emergency call system whereby depressing a button designated "Emergency" or saying "Emergency" causes the activation of all speakerphone units 16 as well as initiation of an outgoing call to a pre-determined telephone number (a telephone number to be called in case of an emergency). Pressing the button or saying the emergency condition word will thereby allow the user to communicate with the called party so long as the user is within range of any one of the speakerphone units 16.

Figure 2:
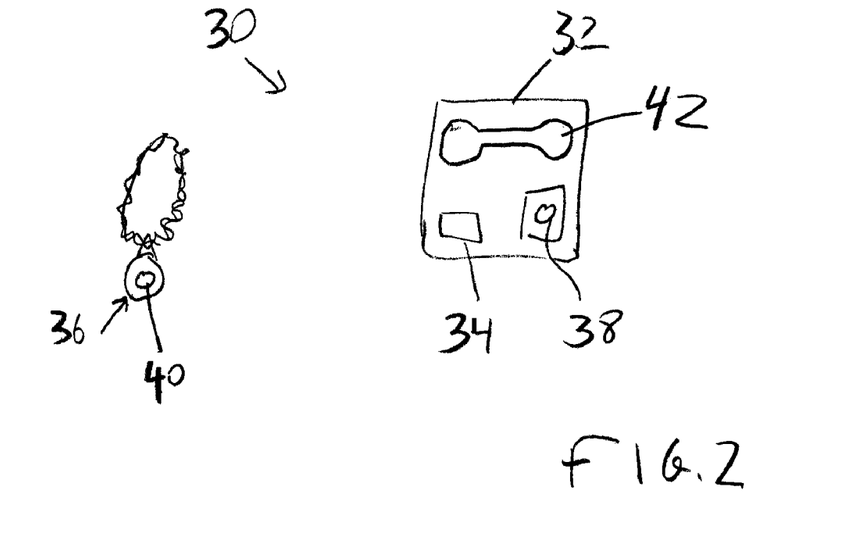
FIG. 2 is a schematic of a first embodiment of an emergency call system according to the present invention.

Referring now to FIG. 2, a first embodiment of an emergency call system in accordance with the invention is designated generally as 30 and includes a communications unit 32 having a speakerphone 34 which can be activated by a remote pendant 36. A call can be placed from the communications unit 32, and if desired the speakerphone 34 can be activated by depressing a designated emergency button 38 on the unit 32 itself or by depressing a button 40 on the pendant 36.

It is important to appreciate that this system is not necessarily an emergency dialer in that there are no stored emergency call numbers that can be called as part of a predetermined dialing sequence when either button 38 on the communications unit 32 or button 40 on the pendant 36 is pressed. Rather, this emergency call system 30 is essentially a standard speakerphone whose speakerphone operation can be controlled by a pendant that can transmit commands to the communications unit 32 to turn the speakerphone 34 on and off. To this end, any conventional transmission and reception arrangement could be used with the transmitter portion of this arrangement being residence in the pendant 36 and activated upon depression of button 40 and the receiver portion being resident in the communications unit 32 and coupled to the speakerphone 34 to activate it, e.g., via an electronic coupling.

Further, it is possible that a telephone call can be placed from a different telephone (other than the handset 42 associated with communications unit 32, and the communications unit 32 can be connected to that call using its speakerphone by depressing a button 40 on the pendant 36. That is, when a call is in progress on the telephone line with which the communications unit 32 is connected, the user can press button 40 on pendant 36 and join that call in progress and converse with the participants to that call using speakerphone 34.

It is possible to design the electronic control system in the communications unit 32 so that depressing the button 40 on the pendant 36 a second time (as detection via the receiver portion of the transmission arrangement coupling the pendant 36 to the communications unit 32) will cause the communications unit 32 to hang-up, i.e., disconnect or terminate usage of the speakerphone 34, even if the built-in handset 42 is removed from its cradle on the emergency call unit 30. This unique feature allows the user to place a call using the handset 42, remotely activate the speakerphone 34, and hang-up using the remote pendant 36 without replacing the handset 42 in its cradle. Therefore, communications unit 32 cannot tie up the telephone line even if the handset 42 is not replaced in its cradle.

Figure 3:
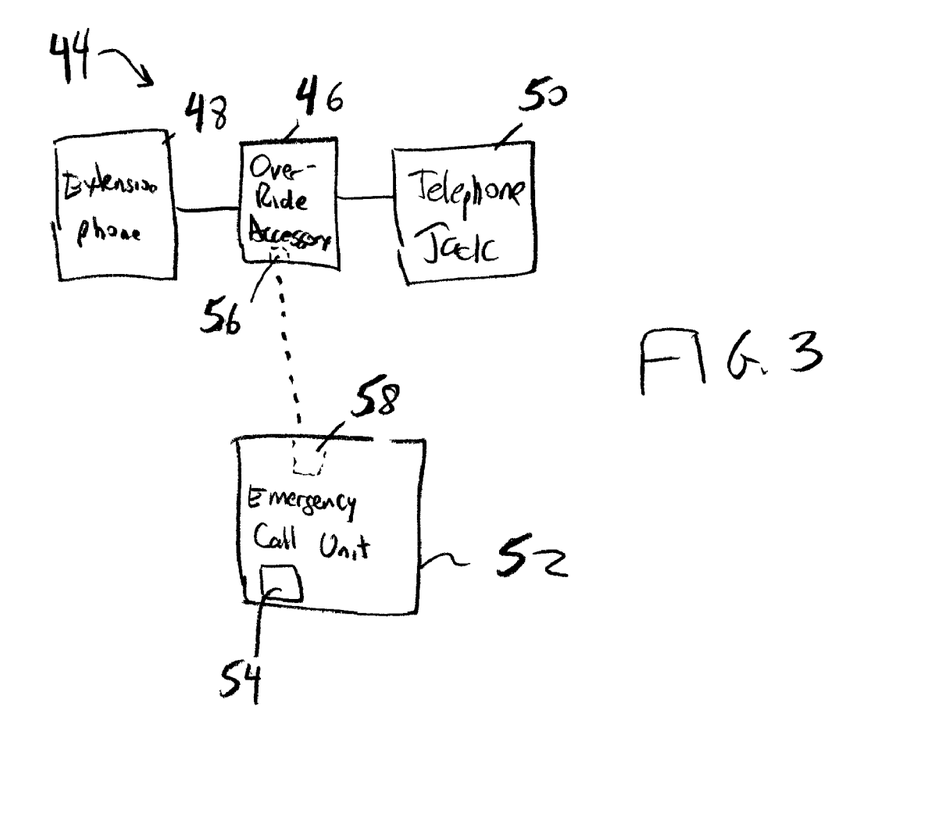
FIG. 3 is a schematic of a second embodiment of an emergency call system according to the present invention.

Another embodiment of an emergency call system in accordance with the invention is shown in FIG. 3 and designated generally as 44. This embodiment is particularly useful for users who do not desire to use the special remote speakerphone unit described above, and desire audio communication at additional locations in the area. This embodiment provides for an "over-ride" accessory 46 that can be used with a standard telephone to essentially disconnect the telephone from the telephone line when an emergency request is made by the main emergency speakerphone unit.

Over-ride accessory 46 is placed between an extension telephone 48 and a telephone jack 50 connecting to the telephone line. Installation of accessory 56 involves removing the cord of the extension telephone 48 from the telephone jack 50 and plugging it into the accessory 46 which is then plugged into the jack 50. The over-ride accessory 46 is equipped with a means of receiving a signal, typically an RF communication, from the main emergency call unit 52 having a speakerphone 54 that can be used to connect and disconnect the extension telephone 48 from the telephone line. Emergency call unit 52 may include features described in U.S. Pat. Nos.

6,212,260 and 6,614,883 and U.S. patent application Ser. No. 11/356,519 filed Feb. 17, 2006, incorporated by reference herein.

Thus, over-ride accessory 46 includes a receiver component 56 of a communications arrangement with the transmitter portion or component 58 of the communications arrangement being resident in, for example, the emergency call unit 52.

When the emergency call unit 52 is commanded to place calls to the stored telephone numbers, it must seize control of the telephone line so that it can place telephone calls. If it is determined that the line is busy, either a telephone was inadvertently left off-hook or someone is on a call, it will transmit a signal to the over-ride accessory 46 to disconnect the extension telephone 48 from the telephone line. The emergency call unit 52 will then take control of the telephone line, and dial the first number.

Once the emergency call unit 52 has control of the telephone line, it could reconnect the extension telephone 48 to the telephone line and begin the dialing process. However, note that keys pressed on an extension telephone could interfere with the dialing process, and the desired emergency telephone numbers may not be dialed properly. Therefore, as an alternative, the extension telephone may be disconnected from the telephone line until a telephone number has been dialed successfully.

An over-ride accessory 46 could be placed between each extension telephone 48 and the telephone jack 50 to which the extension telephone 48 is connected.

By using one emergency call unit having a speakerphone and one or more remote speakerphone units (and/or standard extension telephones with over-ride accessories), it becomes possible to configure an emergency call system that not only affords emergency protection for the user, but also provides a means of possible communication with the called parties from other rooms and locations throughout, e.g., a home or apartment (when special remote speakerphones are used). In addition, any extension telephone that is off-hook cannot prevent an emergency call from being placed.

Figure 4:
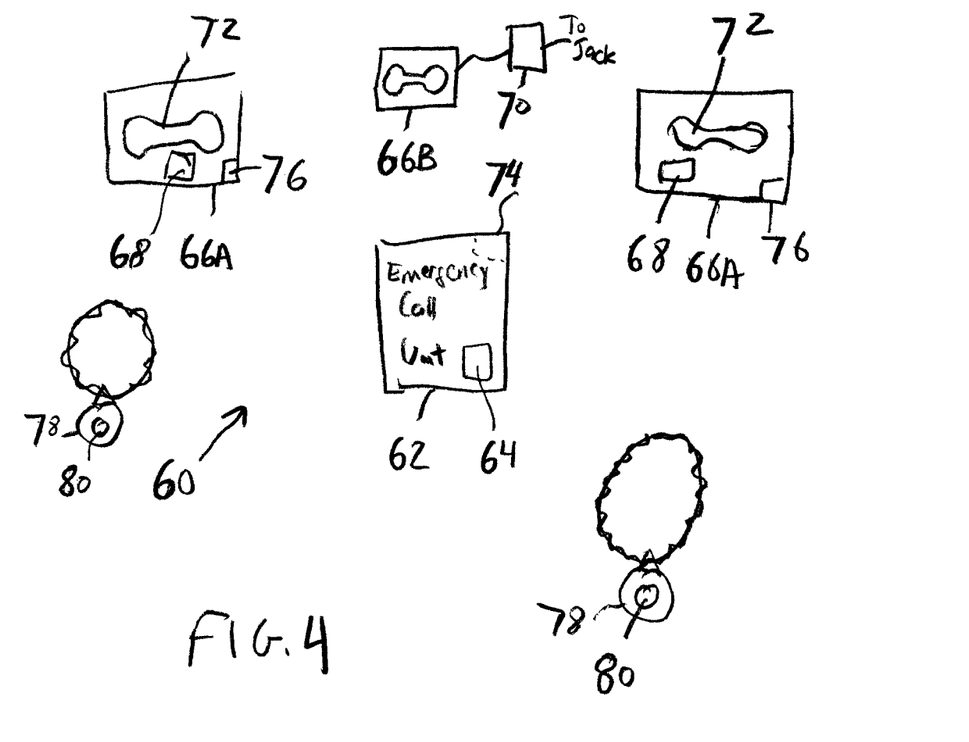
FIG. 4 is a schematic of a third embodiment of an emergency call system according to the present invention.

FIG. 4 is a schematic of such an emergency call system 60 which includes an emergency call unit 62 having a speakerphone 64 (e.g., of the type disclosed in U.S. patent application Ser. No. 11/356,519, two remote speakerphone units 66A with speakerphones 68, an extension telephone 66B and an over-ride accessory 70 interposed between the extension telephone 66B and the jack.

Various operative situations arise for the use of such an emergency call system 60. First, consider a situation in which a handset of extension telephone 66B is off-hook. Emergency call unit 62 cannot make any calls to the stored telephone numbers since it cannot get control of the telephone line. The extension telephone handset that is off-hook has locked out the emergency dialer. (It is of course possible to send a command signal to the over-ride accessory 70 to disconnect the extension telephone 66B from the line.) In the following discussion, the speakerphone unit 66A could be a standard telephone or speakerphone equipped with an over-ride accessory. For clarity, we shall refer to any unit capable of accessing a telephone line as a remote speakerphone unit.

Second, consider a situation in which all remote speakerphone units 66A are remote speakerphones, each equipped or associated with a pendant 78 for example, in the manner described above with respect to FIG. 2, and the main emergency call unit 62 is equipped with a means of communicating with the remote speakerphone units, typically with an RF transmitter (the transmit portion or component 74 being resident in the emergency call unit 62 and the receiver portion or component 76 being resident in the remote speakerphone). A remote speakerphone that is off-hook will also prevent calls from being made. If an emergency call unit 62 is equipped with a means of sending a signal to the remote speakerphones, it could command them to hang-up and thereby allow the emergency call unit 62 to place an emergency call.

The person in distress depresses a button 80 on the emergency pendant 78 requesting help. The emergency call unit 62 checks the telephone line to determine if any remote speakerphone unit 66A, e.g., handset 72, is off-hook. If no remote speakerphone is off-hook, the emergency call unit 62 goes off-hook, seizes the telephone line, and proceeds to dial the first predetermined telephone number.

On the other hand, if the emergency call unit 62 determines that one or more speakerphone units 66A is off-hook, it will send a signal to each unit to hang-up. This clears the line and permits the emergency call unit 62 to go off-hook, seize the telephone line and commence the dialing operation.

Once the main emergency call unit 62 has successfully taken control of the telephone line, it can send a signal to the other remote speakerphone units 66A to go off-hook in the speakerphone mode. At this point, the main emergency call unit 62 and remote speakerphone units 66A can broadcast the audio tones through the speakers indicating that the telephone number is being dialed. Once connected to the called party, all speakerphone units are able to communicate with the called party.

Note that while the telephone number is being dialed by the emergency call unit 62, the keypad on the remote speakerphone units 66A can be disabled. This prevents the inadvertent pressing of a key on the keypad from interfering with the dialing process initiated by the emergency call unit 62. Alternatively, the keypad on a remote speakerphone unit 66A can be disabled during the entire emergency process to further prevent any incorrect signaling or interference.

When the call is completed, and the main emergency call unit 62 hangs up, it will send a command to the remote speakerphone units 66A to also hang up. The telephone line is now cleared again. The main emergency call unit 62 can now go off-hook, seize the telephone line, command the remote speakerphone units 66A to go off-hook, and dial the next telephone number.

Thus with such a system, a user requesting help will be able to request assistance by depressing a button 80 on a remote pendant 78, and will be able to communicate with a called party from the area where the main emergency call unit 62 is located and all other areas equipped with a remote speakerphone unit 66A. All remote speakerphone units 66A and over-ride accessories 70 must be configured to respond to the transmission from the main emergency call unit 62.

The main emergency call unit 62 is in complete control of all operations during the calling sequences. At no time is it possible for the telephone line to be tied up preventing an emergency call from being placed. During normal situations, the main emergency call unit 62 and remote speakerphone units 66A can be used as standard speakerphones with optional remote speakerphone activation.

Figure 5:
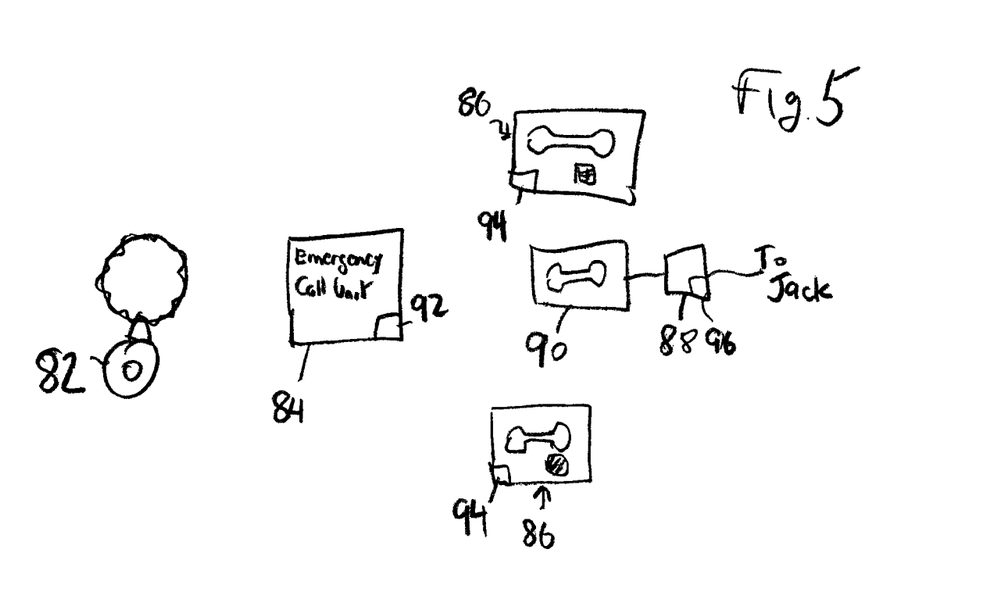
FIG. 5 is a schematic of a fourth embodiment of an emergency call system according to the present invention.

Referring now to FIG. 5, for those users requesting only emergency pendant use, an emergency call system can be provided which includes a single button pendant 82 that transmits an emergency request to a main emergency speakerphone unit 84 which will exercise control over any and all the remote speakerphone units 86 and over-ride accessories 88 associated with extension telephones 90. This transmission is via a communications arrangement having a transmitter portion 92 resident in the main emergency speakerphone unit 84 and a receiver component 94, 96 resident in each of the remote speakerphone units 86 and over-ride accessories 88.

Figure 6:
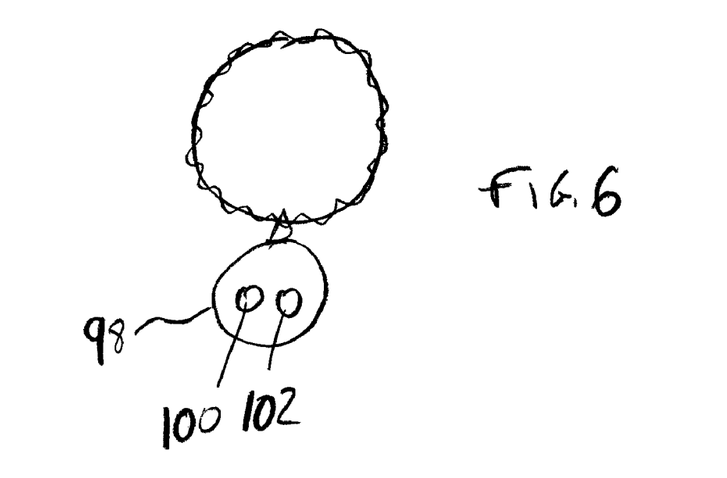
FIG. 6 is a schematic of a pendant for use in an emergency call system according to the present invention.

For those users requesting both emergency pendant use as well as remote speakerphone activation, a two-button pendant 98 can be provided (see FIG. 6). One button 100 will be designated as the emergency request button (in accordance with the embodiment shown in FIG. 5) and the second button 102 will be designated as the remote speakerphone activation button (in accordance with the embodiment shown in FIG. 2).

A variation of any of the embodiments of the invention described above is to provide a conventional cordless telephone which is tied into the speakerphone units or telephones. That is, a cordless telephone may be provided as the handset of any or all of the speakerphone units or telephones in the systems described above. This enables use of the systems at greater distances from the speakerphone units or telephones, e.g., outside of the home or office.

Moreover, a repeater can be applied in any of the embodiments of the invention described above to increase the range of wireless communications.

Another variation of the use of multiple speakerphone units in accordance with the invention for emergency dialing purposes is implemented when each speakerphone unit is designed to hold multiple telephone numbers to be called, for example, when a button on a pendant is pressed (in a manner described above). In such a situation, if there were four speakerphone units sixty feet apart and a person was thirty feet from the closest unit when he or she depresses a button on the speakerphone unit to initiate an emergency dialing routine, the first telephone number in the closest speakerphone unit would be dialed and the others speakerphone units would not dial any numbers. The speakerphone unit that is thirty feet from the user would be activated and the pendant would also be activated. Activation of the pendant would in turn activate the other speakerphone units and when the user comes in range of these subsequently activated speakerphone units, he or she can communicate using them. In this manner, communication can be seamless with the dialed party as the user moves in the home or office into and out of the range of multiple speakerphone units. Even if the user is a significant distance from one of the speakerphone units, he or she could still use the speakerphone units since it is activated via activation of the pendant. This is potentially useful since the range of the pendant is far in excess of the speakerphone range of a unit.

Another variation of the invention involves providing communications between three locations using the speakerphone units. This may be accomplished by linking multiple telephone numbers in one or more of the speakerphone units. Thus, when a first speakerphone unit is activated, e.g., by depressing a button on a pendant, it would dial one number and connect to a similar, second speakerphone unit which in turn would be programmed to dial a third number. Dialing of the third number may be an automatic response or more preferably, only when receiving a call from the first speakerphone unit or a specific one of a pre-determined telephone numbers. To accomplish this, a processor in the speakerphone unit can be programmed to use the conventional "Caller ID" function to identify the source of an incoming call and compare the identified number to a list of numbers stored in its memory. If there is a match to one of the stored numbers, the speakerphone unit would dial another telephone number associated with the incoming number. In this manner, two or more connections are established between speakerphone units. Programming or design of the speakerphone units to achieve this function could be determined by one of ordinary skill in the art.

Another embodiment of the invention enables a user of a cellular telephone, or other remote telecommunications device, to connect to the speakerphone units, i.e., into the speakerphone network. Using a cellular telephone, the user calls a telephone number assigned to the speakerphone unit and ties or links into the speakerphone unit. The speakerphone unit is activated, or multiple speakerphone units are activated, so that people in the home or office in which the speakerphone unit(s) is/are located can listen to whatever is being said or occurring in the vicinity of the cellular telephone and vice versa. Activation of the speakerphone unit may be either by a pendant as described above or can be by other means, such as by pressing a button on the speakerphone unit itself. Programming or design of the speakerphone units to achieve this function could be determined by one of ordinary skill in the art.

Figure 7:
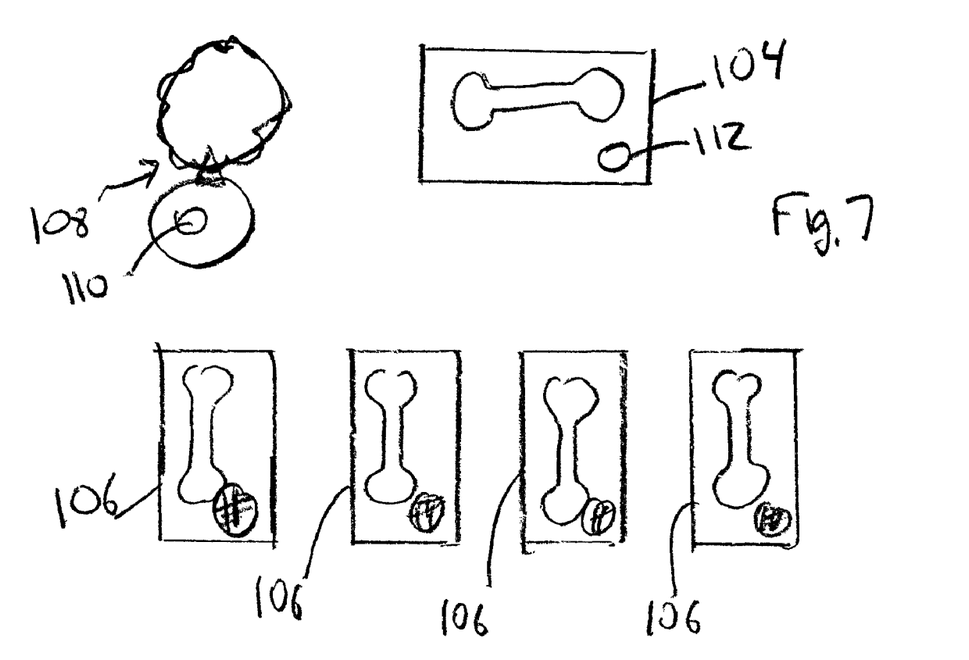
FIG. 7 is a schematic of another configuration of an emergency call system in accordance with the invention.

In yet another embodiment of the invention shown schematically in FIG. 7, a master speakerphone unit 104 is designated and other speakerphone units 106 are considered slave units. The slave units 106 may be extension phones with speakerphone capabilities or other types of speakerphone units, such as described above. A pendant 108 having one or more buttons 110, as described in any of the embodiments above, is associated with the master speakerphone unit 104 which may also include one or more buttons 112.

During emergency operation, when the user presses either button 110 or button 112, the master speakerphone unit 104 is activated and dials the first telephone number stored in its memory. At the same time, it activates all of the slave speakerphone units 106, i.e., activates their speakerphones. This can be achieved by the master speakerphone unit 104 sending a signal to the slave speakerphone units 106, e.g., a wireless signal from a control module on the master speakerphone unit 104 to a reception and control module on the slave speakerphone unit 106. The construction of such modules to provide for signal transmission and reception is readily ascertainable to one of ordinary skill in the art.

Upon activation of the slave speakerphone units 106 by the master speakerphone unit 104, once the called party connects to the telephone line, there will be an open telephone line between the master speakerphone unit 104 and the called party, with all of the slave speakerphone units 106 also being connected to the telephone line. In this manner, the user can talk and so long as they are within range of at least one of the master or slave speakerphone units 104, 106, they can communicate with the called party. This is particularly useful is the user is immobile and cannot reach any of the master or slave speakerphone units 104, 106 but is within range of one of them. Additionally, this system is also applicable for non-emergency uses in that the user can roam around their home or office once the master speakerphone unit 104 activates the slave speakerphone units 106 and converse with the called party so long as they are within range of any one of the master or slave speakerphone units 104, 106.

An important aspect of this configuration of an emergency call system is that when the first telephone call is finished, the master speakerphone unit 104 is programmed to disconnect from the (first) called party and send a signal to disconnect all of the slave speakerphone units 106 from the telephone line. Then, the master speakerphone unit 104 is programmed to call a second telephone number stored in its memory and continue the process of calling the numbers in its memory and sequentially connecting and disconnecting the slave speakerphone units from the telephone line at the start and end of each call, respectively.

To differentiate between the connection of the slave speakerphone unit 106 to the telephone and disconnection, master speakerphone unit 104 is preferably arranged to send different signals. One signal is a connect or activation signal (sent when the master speakerphone unit 104 is dialing a number) and the other is a disconnect or deactivation signal (sent when the master speakerphone unit 106 has terminated the call).

It is also possible to construct the master speakerphone unit 104 to control the slave speakerphone units 106 based on the depression of one or more buttons on the pendant. For example, if the pendant includes two buttons, one button could be depressed to cause the master speakerphone unit 104 to activate all of the slave speakerphone units 106 and the other button could be depressed to cause the master speakerphone unit 104 to deactivate all of the slave speakerphone units 106. A single button could be used with the sequential pressing of the button causing either activation or deactivation of the slave speakerphone units 106 by the master speakerphone unit 104, but two buttons are preferred over one.

Another variation of the invention entails programming multiple emergency call units in accordance with the invention with the same list of telephone numbers to call in an emergency situation. A pendant is provided with one or more buttons, and the speakerphone units include reception modules all designed to receive the same signal from the pendant when a button thereon is depressed. All the speakerphone units are connected to the same telephone line. With this set-up, so long as the user depresses the button within range of any of the speakerphone units, telephone calls will be made in the sequence of numbers stored in the memory of the speakerphone units. This set-up therefore increases the range of the system. The speakerphone units are programmed so that if more than one receives the signal from the pendant, only one initiates the calling sequence.

Additional variations of the invention involve use of cellular telephones. Indeed, whenever mention is made of use of a speakerphone unit, any telecommunications unit which includes a microphone and a speaker is encompassed thereby. A cellular telephone or a satellite communication unit typically include a microphone and speaker and therefore can be used as speakerphone units in any of the embodiments of the invention described above.

Having described a specific preferred embodiment of the invention with reference to the accompanying drawings, it will be appreciated that the present invention is not limited to that precise embodiment, and that various changes and modifications can be effected therein by one of ordinary skill in the art without departing from the scope or spirit of the invention as defined by the appended claims.

What is claimed is:

1. An emergency call system for enabling an individual to call for assistance, comprising:
a pendant adapted to be worn by the individual and including at least one button; and
a communications unit having a speakerphone and being arranged to enable communications via a telephone line,
said communications unit being arranged to indicate when an incoming call on the telephone line is being received by said communications unit to enable the individual to depress said at least one button while the incoming call is being received, causing said speakerphone to be activated and connect to the incoming call and thereby allow the individual to communicate via said speakerphone,
said communications unit being further arranged to initiate an outbound call when the telephone line is not being used and when the individual depresses said at least one button causing said speakerphone to be activated and thereby allow the individual to communicate on the telephone line via said speakerphone, and
said communications unit being further arranged to deactivate said speakerphone upon actuation of one of said at least one button.

2. The system of claim 1, wherein said at least one button consists of a single button, said communications unit being further arranged to activate said speakerphone upon one depression of said button and deactivate said speakerphone upon a subsequent depression of said button.

3. The system of claim 2, wherein said communications unit includes a handset and is arranged such that upon the subsequent depression of said button, said communications unit deactivates said speakerphone even when said handset is removed from engagement with said communications unit.

4. The system of claim 1, wherein said at least one button consists of first and second buttons, said communications unit being arranged to activate said speakerphone upon a depression of said first button and deactivate said speakerphone upon a depression of said second button.

5. The system of claim 1, further comprising a telephone unit connected to same telephone line as said communications unit, said communications unit being arranged such that actuation of said at least one button connects said speakerphone to the telephone line when said telephone unit is in use.

6. The system of claim 5, wherein said communications unit is arranged to dial a stored telephone number upon receipt of the incoming call and enable the called party to join the conversation on the telephone line.

7. The system of claim 6, wherein said communications unit is arranged to dial the stored telephone number only upon receipt of an incoming call from a pre-specified telephone number.

8. An emergency call system, comprising:
an emergency call unit adapted to be connected to a telephone line;
at least one remote speakerphone unit having a speakerphone and adapted to be connected to the same telephone line as said emergency call unit; and
at least one pendant adapted to be worn by the individual and including at least one button;
said emergency call unit being arranged to determine whether any of said at least one remote speakerphone unit prevent an outbound call on the telephone line when a first one of said at least one button on said at least one pendant is actuated and if so, take action to clear the telephone line and enable the outbound call to be made,
said emergency call unit being further arranged to dial a predetermined emergency telephone number when said first button is actuated and the telephone line is available for an outbound call.

9. The system of claim 8, wherein said emergency call unit is arranged to send a signal to said at least one remote speakerphone unit to activate said speakerphone while or after said emergency call unit dials the predetermined emergency telephone number.

10. The system of claim 8, wherein said emergency call unit is arranged to send a signal to said at least one remote speakerphone unit to disable a keypad on said at least one remote speakerphone unit at least while said emergency call unit dials the predetermined emergency telephone number.

11. The system of claim 8, wherein said emergency call unit is arranged to send a signal to said at least one remote speakerphone unit to deactivate said speakerphone after said emergency call unit completes a call to the predetermined emergency telephone number.

12. The system of claim 8, further comprising a plurality of remote speakerphone units and a plurality of pendants, each of said pendants being associated with only a single one of said remote speakerphone units.

13. The system of claim 8, further comprising:
an extension telephone; and
an over-ride accessory for connecting said extension telephone to the same telephone line as said emergency call unit,
said over-ride accessory being arranged to communicate with said emergency call unit and connect or disconnect said extension telephone from the telephone line based on signals from said emergency call unit.

14. The system of claim 13, wherein said emergency call unit includes transmission means for transmitting a command signal indicative of whether said over-ride accessory should connect or disconnect said extension telephone from the telephone line and said over-ride accessory includes receiving means for receiving the command signal from said transmission means.

15. The system of claim 14, wherein said emergency call unit is arranged to transmit the command signal via said transmission means upon a determination that an outbound call cannot be made on the telephone line.

16. The system of claim 8, wherein said emergency call unit includes a speakerphone and said at least one pendant includes two buttons, a second one of said two buttons being actuated to cause said emergency call unit to activate and deactivate said speakerphone.

17. The system of claim 16, wherein said emergency call unit is arranged to activate said speakerphone upon one depression of said second button and deactivate said speakerphone upon a subsequent depression of said second button.

18. The system of claim 17, wherein said emergency call unit includes a handset and is arranged such that upon the subsequent depression of said second button, said emergency call unit deactivates said speakerphone even when said handset is removed from engagement with said emergency call unit.

19. The system of claim 1, wherein said communications unit is further arranged to determine whether the outbound call can be made using the telephone line and if not, take steps to enable the outbound call to be made.

20. The system of claim 19, wherein said communications unit is arranged to seize the line in order to enable the outbound call to be made.

21. The system of claim 8, wherein said emergency call unit is arranged to determine whether any of said at least one remote speakerphone unit are off-hook thereby preventing the outbound call on the telephone line when the first one of said at least one button on said at least one pendant is actuated and if so, send a signal to each of said at least one remote speakerphone unit to disconnect from the telephone line such that the sending of the signal constitutes the action taken to clear the telephone line.

22. The system of claim 8, further comprising:
an extension telephone; and
an over-ride accessory that selectively connects said extension telephone to the same telephone line as said emergency call unit,
said over-ride accessory being arranged to communicate with said emergency call unit and connect said extension telephone from the telephone line based on a first signal from said emergency call unit and disconnect said extension telephone from the telephone line based on a second signal from said emergency call unit.

23. The system of claim 22, wherein said emergency call unit includes transmission means for transmitting the first and second signals to said over-ride accessory and said over-ride accessory including receiving means for receiving the first and second signals from said transmission means.

24. The system of claim 23, wherein said emergency call unit is arranged to transmit the second signal via said transmission means upon a determination that an outbound call cannot be made on the telephone line.

\* \* \* \* \*